US00RE46732E

(19) United States
(12) Reissued Patent
Uchida et al.

(10) Patent Number: US RE46,732 E
(45) Date of Reissued Patent: Feb. 27, 2018

(54) FACILITY SEARCHING DEVICE, PROGRAM, NAVIGATION DEVICE, AND FACILITY SEARCHING METHOD

(71) Applicant: JVC Kenwood Corporation, Yokohama-shi, Kanagawa (JP)

(72) Inventors: Hiromi Uchida, Machida (JP); Akihiko Hamanaka, Nishitama-gun (JP); Masahiro Ueno, Suginami-ku (JP)

(73) Assignee: JVC Kenwood Corporation, Yokohama-shi (JP)

(21) Appl. No.: 14/521,891

(22) Filed: Oct. 23, 2014

Related U.S. Patent Documents

Reissue of:
(64) Patent No.: 7,894,985
Issued: Feb. 22, 2011
Appl. No.: 10/594,115
PCT Filed: Mar. 30, 2005
PCT No.: PCT/JP2005/006698
§ 371 (c)(1),
(2) Date: Sep. 25, 2006
PCT Pub. No.: WO2005/096184
PCT Pub. Date: Oct. 13, 2005

U.S. Applications:
(63) Continuation of application No. 13/772,897, filed on Feb. 21, 2013, now Pat. No. Re. 45,220, which is an application for the reissue of Pat. No. 7,894,985.

(30) Foreign Application Priority Data

Mar. 31, 2004 (JP) ..... 2004-103973

(51) Int. Cl.
*B62D 6/00* (2006.01)
*B62D 7/15* (2006.01)

(52) U.S. Cl.
CPC ..... *B62D 7/159* (2013.01)

(58) Field of Classification Search
CPC ..... G01C 21/3664; B62D 7/159
(Continued)

(56) References Cited

U.S. PATENT DOCUMENTS 5,850,618 A * 12/1998 Suetsugu ..... G01C 21/367 701/428
6,041,281 A 3/2000 Nimura et al.
(Continued)

FOREIGN PATENT DOCUMENTS

CN 1382960 12/2002
EP 0 822 529 2/1998
(Continued)

OTHER PUBLICATIONS

Chinese Office Action dated Jul. 10, 2009.
(Continued)

*Primary Examiner* — Michelle Tarae
(74) *Attorney, Agent, or Firm* — Robinson Intellectual Property Law Office; Eric J. Robinson

(57) ABSTRACT

A facility searching technique easier to operate and having high degree of freedom. A facility searching device is constructed from a database on map information, a database relating to various kinds of facilities and including positional information of the facilities, a display unit for displaying, based on the map information, a map of a predetermined area, a pointing device for inputting a position located on the displayed map, a voice input unit for inputting by voice an instruction relating to search for facilities, and unit (25, 29, 30, 31) for performing the search for facilities upon receiving the input of a position or the input of an instruction (steps 21-22, 24, 26, 27, 28), the search being based on the inputted position and the instruction.

10 Claims, 8 Drawing Sheets

(58) Field of Classification Search
USPC ..... 701/438, 43
See application file for complete search history.

(56) References Cited

U.S. PATENT DOCUMENTS

| | | | | |
|---|---|---|---|---|
| 6,144,318 | A * | 11/2000 | Hayashi | G01C 21/3658 340/988 |
| 6,462,676 | B1 * | 10/2002 | Koizumi | 340/995.1 |
| 6,542,816 | B1 * | 4/2003 | Ito | G01C 21/32 340/905 |
| 6,906,643 | B2 * | 6/2005 | Samadani | G01C 7/00 340/995.1 |
| 7,184,885 | B2 * | 2/2007 | Watanabe | G01C 21/36 340/995.23 |
| 7,211,980 | B1 * | 5/2007 | Bruemmer | G05D 1/0214 318/567 |
| 7,487,114 | B2 * | 2/2009 | Florance | G06Q 30/0643 701/438 |
| 7,587,260 | B2 * | 9/2009 | Bruemmer | G06N 3/008 318/567 |
| 2002/0169547 | A1 | 11/2002 | Harada | |
| 2003/0171871 | A1 | 9/2003 | Tabata | |
| 2003/0182052 | A1 | 9/2003 | DeLorme et al. | |

FOREIGN PATENT DOCUMENTS

| | | |
|---|---|---|
| EP | 1 258 707 | 11/2002 |
| JP | 09-072753 | 3/1997 |
| JP | 2001-184359 | 7/2001 |
| JP | 2002-055989 | 2/2002 |
| JP | 2002-303530 | 10/2002 |
| JP | 2002-304256 | 10/2002 |
| JP | 2002-340596 | 11/2002 |
| JP | 2002-350151 | 12/2002 |
| JP | 2003-042795 | 2/2003 |
| JP | 2003-203075 | 7/2003 |
| JP | 2003-207352 | 7/2003 |

OTHER PUBLICATIONS

Japanese Office Action dated Nov. 9, 2009.

Supplemental European Search Report (Application No. 05728622.1) dated May 29, 2009.

Office Action, Application No. 2012-224209, dated Oct. 22, 2013.

International Preliminary Examination Report for Application No. PCT/JP2005/006698 dated Mar. 1, 2007.

Supplementary European Search Report (Application No. 05728622.1) Dated May 29, 2009.

International Search Report for PCT/JP2005/006698 dated May 17, 2005.

Office Action (Application No. JP 2004-103973) dated Apr. 15, 2009.

Office Action (Application No. JP 2004-103973) dated Jul. 8, 2009.

* cited by examiner

FACILITY SEARCHING DEVICE, PROGRAM, NAVIGATION DEVICE, AND FACILITY SEARCHING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a continuation reissue application of U.S. Ser. No. 13/772,897 (U.S. Pat. No. RE45,220 issued Oct. 28, 2014), which is a reissue of U.S. Pat. No. 7,894,985 issued Feb. 22, 2011.*

*Notice: More than one reissue application has been filed for the reissue of U.S. Pat. No. 7,894,985. The reissue applications are the present application and U.S. Ser. No. 13/772,897. The present application is a continuation reissue of U.S. Ser. No. 13/772,897, which is a reissue of U.S. Pat. No. 7,894,985.*

TECHNICAL FIELD

The present invention relates to a facility searching device for searching various kinds of facilities, programs for configuring the facility searching device, a navigation device including the facility searching device, and a facility searching method.

BACKGROUND ART

To date, a navigation device has been known that is provided with a database for various kinds of facilities belonging to various kinds of genres and has a neighborhood search function in which, with regard to a designated genre, facilities in the vicinity of the current position are listed up and displayed (e.g., refer to Japanese Patent Application Laid-Open No. 2001-264083). In the navigation device, when a menu key is depressed, a main menu and a submenu are displayed; when "search" is selected from the main menu, "neighboring facilities" is selected from the submenu, and a desired genre is selected, a facility search with respect to the current position is implemented. In implementing the facility search, facilities, belonging to the genre, that exist within a predetermined area with respect to the current position are listed up in order of increasing distance from the current position and displayed along with the respective distances between the current position and the facilities and the respective orientations of the facilities with respect to the current position.

However, with the conventional technique described above, the operation of making selection from a plurality of menus is required to be implemented two or more times before the search is carried out. In addition, facilities existing within the predetermined area with respect to the current position are displayed along with the respective distances between the facilities and the current position and the respective orientations of the facilities with respect to the current position; therefore, it is necessary to infer the positions of the facilities, based on the respective distances between the facilities and the current position and the respective orientations of the facilities with respect to the current position. Additionally, because the neighborhood search is carried out within the predetermined area with respect to the current position, the positional range in which the search is carried out cannot arbitrarily be set in accordance with the geography, such as roads, rivers, and topography, of the vicinity.

In consideration of the foregoing problems, the object of the present invention is to provide a facility-search technique that enables easier operation and a high degree of freedom.

DISCLOSURE OF THE INVENTION

In order to achieve the foregoing object, a facility searching device according to the first aspect of the present invention is characterized by including a database related to map information, a database, related to various kinds of facilities, that includes positional information for the facilities, a display means for displaying a map for a predetermined area, based on the map information, a pointing device for inputting a position in a displayed map, a voice input means for implementing voice input of an instruction related to a search for facilities, and a search means for, in response to the input of the position and the instruction, implementing a search related to facilities, based on the inputted position and the instruction.

In this situation, for example, a facility searching device incorporated in a navigation device corresponds to the facility searching device according to the present invention. For example, a map, with a predetermined scale, that is represented with respect to a current position of the facility searching device or a designated position corresponds to the map for a predetermined area. For example, a means that has a function of applying noise suppression processing to a sound signal obtained by converting a user's utterance into an electric signal and then implementing voice recognition with reference to predetermined acoustic models corresponds to the voice input means. For example, a touch panel or a touch pad corresponds to the pointing device. For example, a genre for facilities as search subjects corresponds to the instruction related to a search for facilities. For example, a search for facilities that are located along a road specified by inputted positions or within an area specified by inputted positions and fall under a designated genre corresponds to the search related to facilities. No prioritization between position input and the instruction input may be defined, or both the position input and the instruction input may be implemented concurrently.

With the foregoing configuration, when the user utters the instruction related to a search for facilities and points or traces arbitrary positions in a map displayed on the display means, the instruction and the position are inputted to the facility searching device. In response to the input of the position and the instruction, the search means implements a search for facilities in the database, based on the inputted position and the instruction, and extracts the corresponding facilities. Accordingly, merely by implementing approximately at the same time the utterance for the instruction related to facility search and input operation for a position, the user can implement a search for facilities that exist within a desired positional area and correspond to the instruction.

The facility searching device according to the second aspect of the present invention is characterized in that, in the first aspect of the present invention, a current position acquisition means for acquiring a current position of the facility searching device and a determination means for determining whether or not the instruction input has been implemented without being accompanied by the position input are included, and in the case where the determination means positively determines, the search means implements based on the instruction a search related to the facilities, with respect to a current position. The positive determination can be implemented, e.g., in the case where, with no position inputted, a predetermined time period has elapsed from the time point of inputting of the instruction.

The facility searching device according to the third aspect of the present invention is characterized in that, in the first or the second aspect of the present invention, a determination means is included that determines whether or not, as the position input, only one position has been inputted along with the instruction input, and in the case where the determination means positively determines, the search means implements with respect to the one position a search related to the facilities, based on the instruction. The determination that only one position has been inputted can be implemented, e.g., in the case where a predetermined time period has elapsed from the time point of the first inputting of the instruction, without any other positions inputted.

The facility searching device according to the fourth aspect of the present invention is characterized in that, in any one of the first to third aspects of the present invention, a determination means is included that determines whether or not, as the position input, a plurality of positions that indicates a specific road in the map has been inputted along with the instruction input, and in the case where the determination means positively determines, the search means implements based on the instruction a search for facilities that exist along the specific road or within a predetermined distance from the specific road. For example, input of respective positions on a trajectory obtained by the user's tracing of a touch panel as a pointing device, along a specific road in the map, corresponds to the input of a plurality of positions that indicates a specific road.

The facility searching device according to the fifth aspect of the present invention is characterized in that, in the fourth aspect of the present invention, the determination means makes a positive determination when the plurality of positions exists within a predetermined distance from the specific road and the position, among the positions, that is inputted last exists on the specific road.

The facility searching device according to the sixth aspect of the present invention is characterized in that, in any one of the first to fifth aspects of the present invention, a determination means is included that determines whether or not, as the position input, a plurality of positions that indicates a specific area in the map has been inputted along with the instruction input, and in the case where the determination means positively determines, the search means implements based on the instruction a search related to the facilities, with regard to facilities included in the specific area. For example, input of respective positions on a trajectory obtained by tracing of a touch panel as a pointing device, in such a way as to encircle the specific area in the map, corresponds to the input of a plurality of positions that indicates the specific area.

The facility searching device according to the seventh aspect of the present invention is characterized in that, in any one of the first to sixth aspects of the present invention, a determination means is included that determines whether or not, a plurality of positions that, as the position input, is inputted along with the instruction input indicates neither any road nor any area in the map, and in the case where the determination means positively determines, the search means implements based on the instruction a search related to the facilities, with respect to the middle position between the firstly inputted position and the lastly inputted position among the plurality of positions.

The facility searching device according to the eighth aspect of the present invention is characterized in that, in any one of the fourth to seventh aspects of the present invention, input of the plurality of positions is implemented through operation in which, by means of the pointing device, the pointing position is moved through pointing or through dragging on the map.

The facility searching device according to the ninth aspect of the present invention is characterized in that, in any one of the first to eighth aspects of the present invention, a determination means is included that determines whether or not, as the position input, input has been implemented, along with the instruction input, in which a specific road in the map is traced or two or more roads that intersect each other or that are connected with each other are traced by means of the pointing device, and in the case where the determination means positively determines, the search means implements based on the instruction a search related to the facilities, with regard to facilities that exist along the specific road or the two or more roads, or that exist within a predetermined distance from the specific road or each of the two or more roads. For example, input through operation in which, by means of the pointing device, the pointing position is moved through pointing or through dragging on the map corresponds to the input implemented in a tracing manner.

The facility searching device according to the tenth aspect of the present invention is characterized in that, in the ninth aspect of the present invention, a facility search for facilities that exist along the specific road or within the predetermined distance from the specific road is implemented over a range from the beginning position to the final position of the input that is implemented in a tracing manner.

The facility searching device according to the eleventh aspect of the present invention is characterized in that, in any one of the first to tenth aspects of the present invention, an input determination means is included that determines whether or not, as the position input, input of only two positions, through a first point operation and a second point operation carried-out within a predetermined time period after the first point operation, has been implemented along with the instruction input.

The facility searching device according to the twelfth aspect of the present invention is characterized in that, in the eleventh aspect of the present invention, a determination means is included that determines whether or not the two positions are located on a same road, when the input determination means determines that the input for only the two positions has been implemented along with the instruction input, and in the case where the determination means positively determines, the search means implements based on the instruction a search related to the facilities, with regard to facilities that exist along the specific road or within a predetermined distance from the specific road.

The facility searching device according to the thirteenth aspect of the present invention is characterized in that, in the twelfth aspect of the present invention, a facility search for facilities that exist along the specific road or within the predetermined distance from the specific road is implemented over a range between the two positions.

The facility searching device according to the fourteenth aspect of the present invention is characterized in that, in any one of the eleventh to thirteenth aspects of the present invention, a determination means is included that determines whether or not the two positions are located on a same road, when the input determination means determines that the input for only the two positions has been implemented along with the instruction input, and in the case where the determination means negatively determines, the search means implements based on the instruction a search related to the facilities, with respect to the middle position between the two positions.

The facility searching device according to the fifteenth aspect of the present invention is characterized in that, in any one of the first to fourteenth aspects of the present invention, a determination means is included that determines whether or not, as the position input, input of three or more positions, through three or more point operation events, has been consecutively implemented without being interrupted for more than a predetermined duration, along with the instruction input, and in the case where the determination means positively determines, the search means implements based on the instruction a search related to the facilities, with regard to facilities that exist-within a triangular or a polygonal area having as the vertexes the three or more positions.

The facility searching device according to the sixteenth aspect of the present invention is characterized in that, in any one of the first to fifteenth aspects of the present invention, the voice input means accepts input of the instruction related to a search for the facilities, in response to input of a position on the displayed map.

The facility searching device according to the seventeenth aspect of the present invention is characterized in that, in any one of the second, third, seventh, and fourteenth aspects of the present invention, the search implemented with respect to a position lists and displays facilities within a predetermined distance from the position, in order of increasing distance from the position.

The facility searching device according to the eighteenth aspect of the present invention is characterized in that, in any one of the first to seventeenth aspects of the present invention, the instruction related to a search for the facilities includes at least one of the instruction of a genre name as a search subject, the instruction of a proper name as a search subject, and the instruction of the usage purpose, of a facility, as a search subject.

The facility searching device according to the nineteenth aspect of the present invention is characterized in that, in the fourth, fifth, ninth, and twelfth aspects of the present invention, a facility search for facilities that exist along the specific road or within the predetermined distance from the specific road is implemented within the range of the specific road displayed by the display means.

A navigation device according to the twentieth aspect of the present invention is characterized by being provided with any one of the facility searching devices according to the first to nineteenth aspects of the present invention and by sharing the database related to map information with the facility searching device.

A program according to the twenty-first aspect of the present invention is characterized by making a computer function as a means for configuring any one of the facility searching devices according to the first to twentieth aspects of the present invention.

A facility searching method according to the twenty-second aspect of the present invention is characterized by including a display step, by a computer, of displaying a map for a predetermined area, based on a database related to map information, a position input step, by the computer, of receiving input of a position in the displayed map, by means of a pointing device, an instruction input step, by the computer, of receiving voice input for the instruction related to a search for facilities, and a search step, by the computer, of, in response to the position input and the instruction input and based on the database related to map information, a database, related to various kinds of facilities, that includes positional information of the facilities, and the inputted position and the instruction, implementing a search related to the facilities.

BEST MODE FOR CARRYING OUT THE INVENTION

Figure 1:
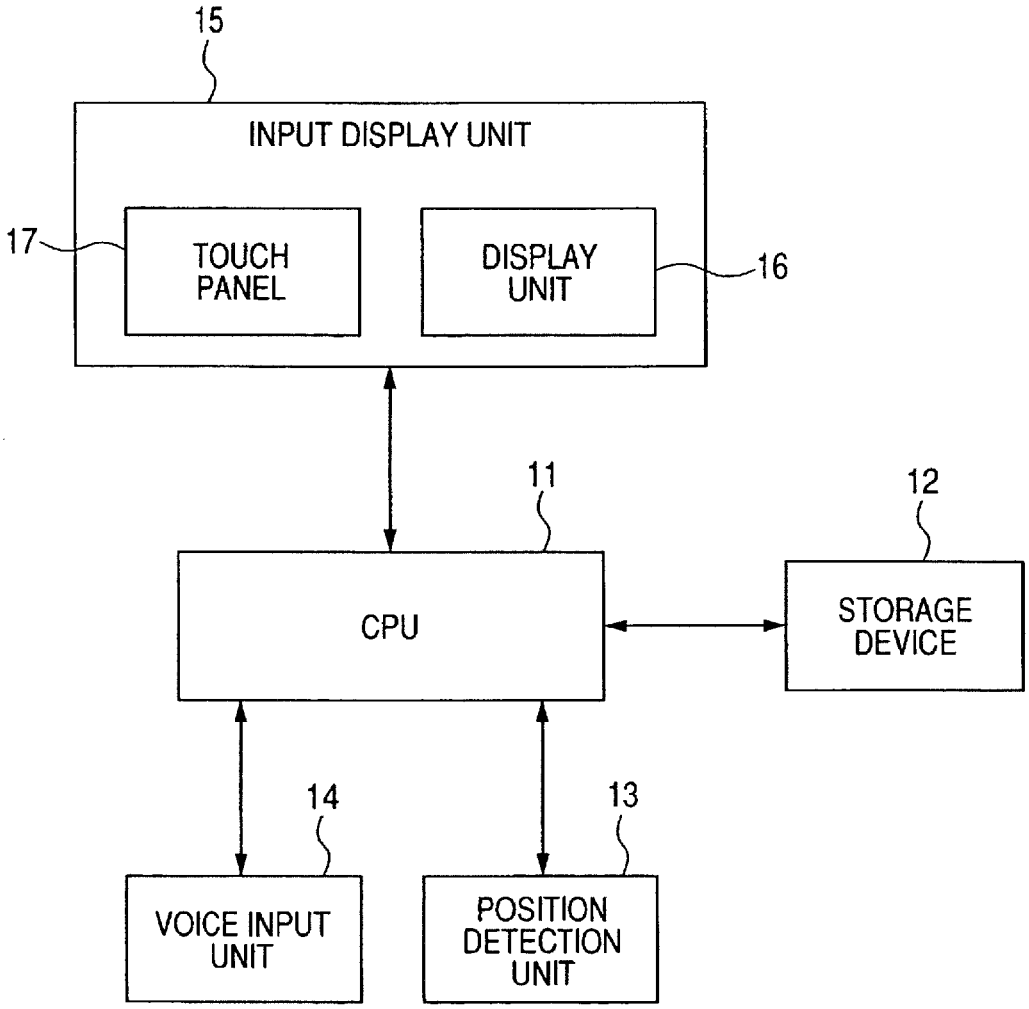
FIG. 1 is a block diagram illustrating a navigation device according to an embodiment of the present invention.

FIG. 1 is a block diagram illustrating a navigation device according to an embodiment of the present invention. In FIG. 1, Reference Numeral 11 denotes a CPU for controlling units of the device; Reference Numeral 12, a storage device for storing information that is required when the CPU 11 controls the units of the device; Reference Numeral 13, a position detection unit consisting of a position acquisition means that acquires a current position; Reference Numeral 14, a voice input unit for issuing an instruction to the CPU 11, through input of voice; and Reference Numeral 15, a input display unit for giving information to the driver of a vehicle in which the navigation device is mounted and receiving the instructions from the driver.

The storage device 12 consists of a ROM, a RAM, an optical disk device, and the like. The ROM stores control programs, fonts utilized for displaying images, bit-mapped (BMP) files, acoustic-model data for voice recognition, and the like. The RAM stores data and programs for processing implemented by the CPU 11. The optical disk device includes an optical disk that stores map data, a database having information including the positional information items on various genres of facilities, and the like. The position detection unit 13 acquires a current position, by utilizing a GPS, mileage, and an angular-velocity sensor.

The input display unit 15 includes a display unit 16, consisting of a liquid crystal display and the like, and a touch panel 17 mounted on the screen of the display unit 16. The display unit 16 provides a user with a display of predetermined information, in accordance with control by the CPU 11. The touch panel 17 provides the CPU 11 with the information on a depressed position. The CPU 11 can recognize the contents of input by the user, based on the respective positions and the respective contents of the display elements in the display unit 16 and the depressed-position information from the touch panel 17.

The voice input unit 14 is provided with a microphone for converting a voice generated through utterance by the user into a sound signal as an electric signal. By applying predetermined noise suppression processing to the sound signal and then implementing voice recognition, with reference to acoustic models, the CPU 11 can recognize the contents of the user's utterance the instruction.

Base on the instruction by the user, the map data, the current position, and the like, the CPU 11 implements route search processing for the destination, display of a map for the vicinity of the current position, display of the current position and the traveling direction, the instructions for the turning directions at intersections on the route, and the like. In response to the user's input of a position in the map and the user's input of an instruction related to facility search, the CPU 11 also implements, in accordance with a program, facility search processing in which, based on the inputted position and the instruction, the facility included in the database is searched and displayed.

Figure 2:
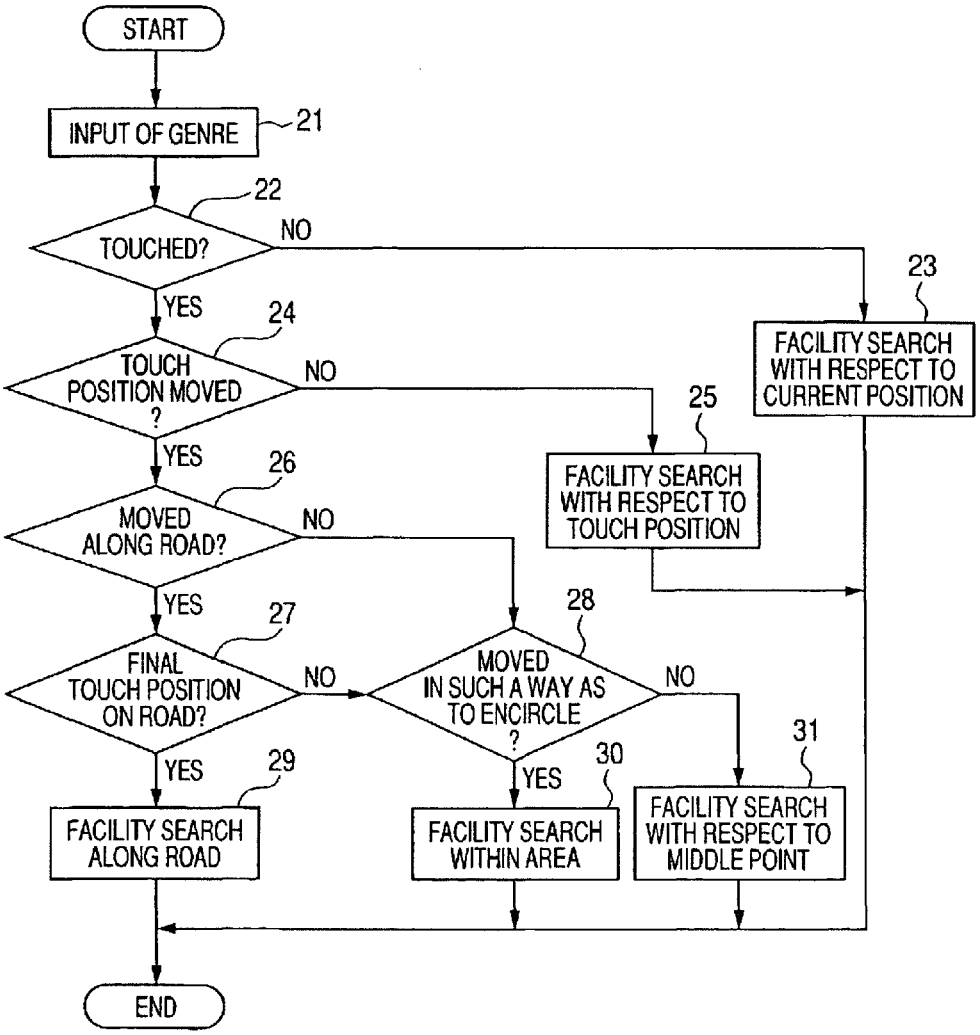
FIG. 2 is a flowchart illustrating an example of the operation, in facility search processing, of the navigation device in FIG. 1.

FIG. 2 is a flowchart illustrating an example of the operation, in facility search processing, of the navigation device. In this figure, however, FIG. 2 illustrates the operation in the case where the user firstly utters a genre name and then implements touch operation. In addition, it is assumed that, at the beginning of the processing, a map for the area surrounding a current position is displayed on the display unit 16. Additionally, it is assumed that a "touch position" signifies a position, in the displayed map, that corresponds to a position, on the touch panel 17, that is touched.

When the user utters a specific genre name, the CPU 11 firstly implements, in Step 21, the voice recognition for the sound signal based on the utterance; in the case where the recognized word falls under the genre name that specifies a genre to which any one of the facilities within the database belongs, the CPU 11 determines that an input designating that genre name has been made.

In response to the determination, the CPU 11 determines, in Step 22, whether or not the touch panel 17 has been touched within a predetermined time from the determination. When it is determined that the touch panel 17 has been touched, the CPU 11 proceeds to Step 24; in contrast, when it is determined that the touch panel 17 has not been touched, the CPU 11 proceeds to Step 23.

Figure 3:
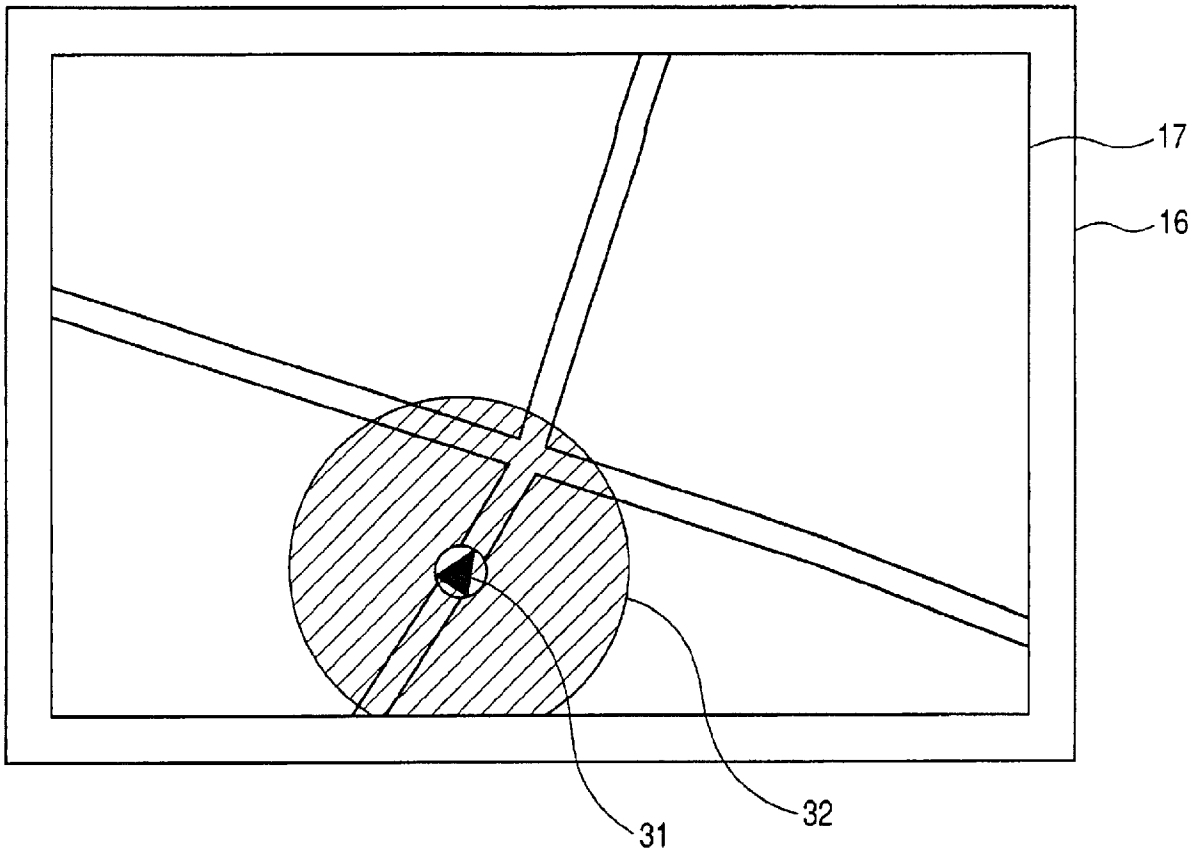
FIG. 3 is a view illustrating an appearance of the display unit, in facility search processing, of the navigation device in FIG. 1.

In Step 23, facility search is implemented with respect to the current position. In other words, the CPU 11 extracts information items, among the information items about various genres of facilities stored in the storage device 12, that relate to the facilities included in the genre name designated in Step 21 and that, as illustrated in FIG. 3, exist in an area 32 within a predetermined distance from the current position 31. Next, with regard to the extracted facilities, the facility names, the distances between the facilities and the current position, and the like are displayed on the display unit 16. On that occasion, the display may be implemented in such a way that the facilities are arranged in order of the increasing distance between the facilities and the current position. When the display has been completed, the CPU 11 ends the facility search processing.

In Step 24, after the touch panel 17 is touched, the CPU 11 determines whether or not the touch position has moved by a predetermined distance or farther. The predetermined distance is determined in view of distinguishing a mere touch from an intentional transfer of the touch position. When it is determined that the touch position has not moved by a predetermined distance or farther, the CPU 11 proceeds to Step 25; in contrast, when it is determined that the touch position has moved by a predetermined distance or farther, the CPU 11 proceeds to Step 26.

In Step 25, the facility search is implemented with respect to the touch position. That is to say, the CPU 11, as is the case with Step 23, extracts and displays facilities, except that the touch position is employed as the reference. When the facility search has been completed, the CPU 11 ends the facility search processing.

Figure 4:
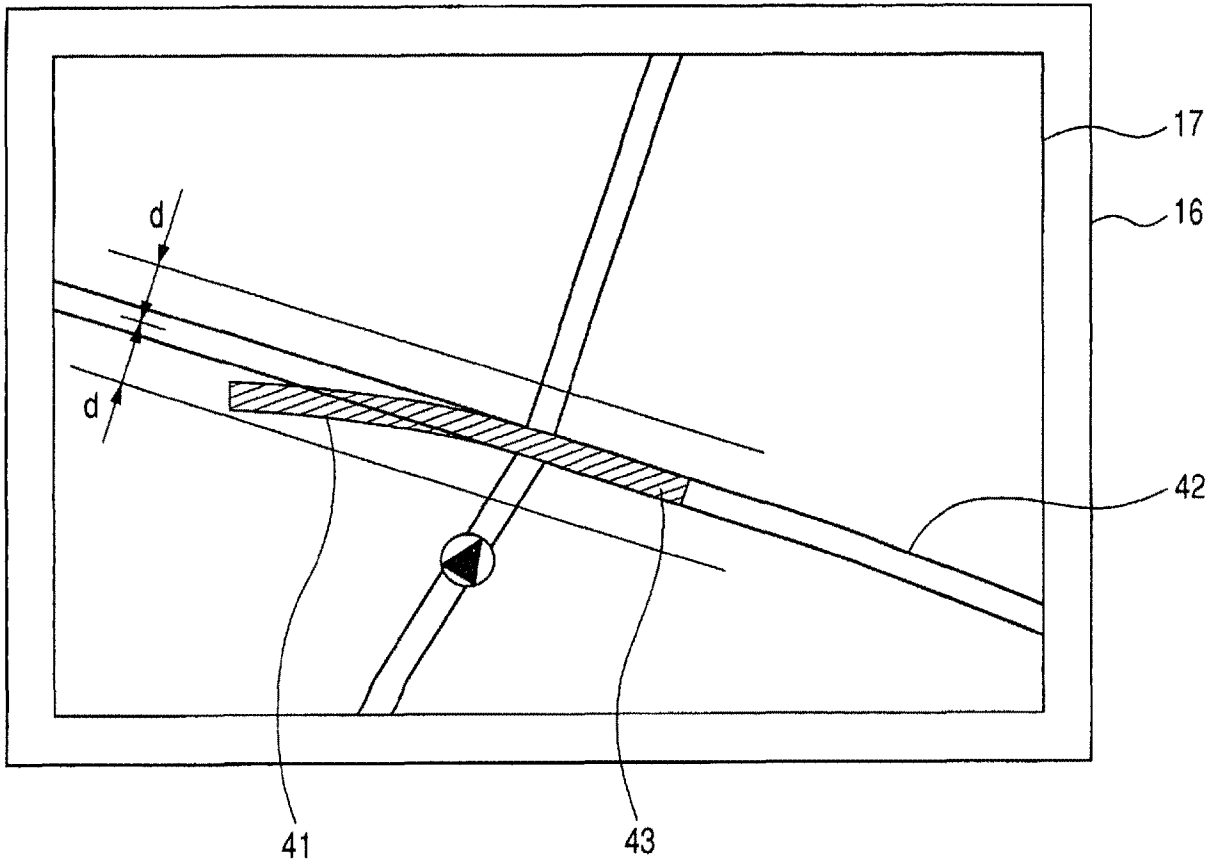
FIG. 4 is a view illustrating another appearance of the display unit, in facility search processing, of the navigation device in FIG. 1.

In Step 26, whether or not the transfer of the touch position is along any of the roads in the displayed map is determined. In the case where, as illustrated in FIG. 4, the respective touch positions on a touch-position transfer trajectory 41 are within a predetermined distance d from a specific road 42, it can be determined that the transfer of the touch position is along the road 42. When it is determined that the transfer of the touch position is along any one of the roads, the CPU 11 proceeds to Step 27; in contrast, when it is determined that the transfer of the touch position is along none of the roads, the CPU 11 proceeds to Step 28.

In Step 27, it is further determined whether or not the position at which the touch-position transfer is completed, i.e., the final touch position 43 where the user's finger is released from the touch panel 17 is located on the road 42 along which the touch-position transfer is implemented. When it is determined that the final touch position is located on the road 42, the CPU 11 proceeds to Step 29; in contrast, when it is determined that the final touch position is not located on the road 42, the CPU 11 proceeds to Step 28.

In Step 29, the CPU 11 considers that the road 42 on which the final touch position is located has been designated by the touch, and implements the facility search for facilities along the road 42. In other words, the CPU 11 extracts information items, among the information items about various genres of facilities stored in the storage device 12, that relate to the facilities that are included in the genre name designated in Step 21 and that exist along the designated road 42. Next, with regard to the extracted facilities, display similar to that in Step 23 is implemented. When the display has been completed, the CPU 11 ends the facility search processing.

Figure 5:
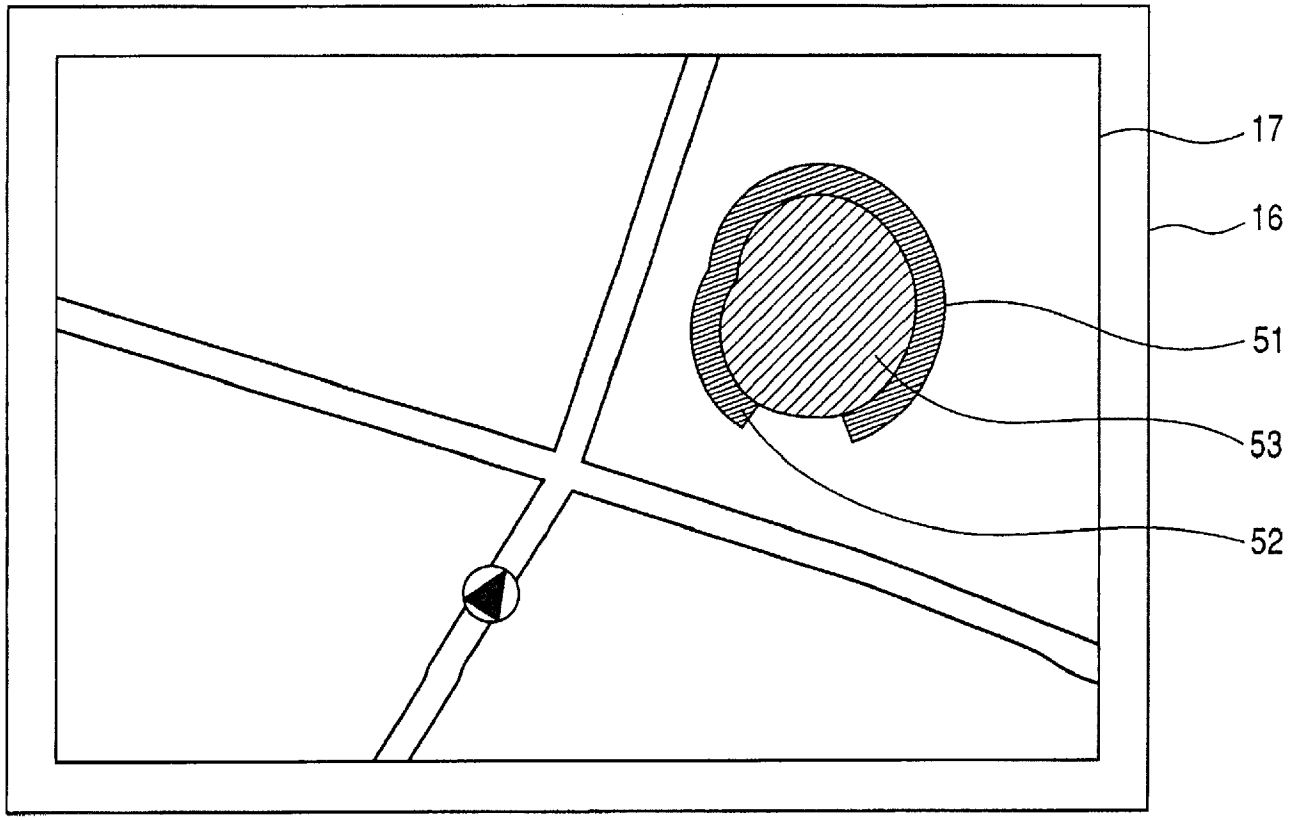
FIG. 5 is a view illustrating further another appearance of the display unit, in facility search processing, of the navigation device in FIG. 1.

In Step 28, based on predetermined logic, it is determined whether or not, as illustrated in FIG. 5, a trajectory 51 of the touch-position transfer starts at a first touch position 52 and encircles any specific area 53 in the displayed map. When it is determined that the trajectory 51 of the touch-position transfer encircles any specific area 53, the CPU 11 proceeds to Step 30; in contrast, when it is determined that the trajectory 51 of the touch-position transfer does not encircle any specific area, the CPU 11 proceeds to Step 31.

In Step 30, the facility search for facilities existing within the encircled area 53 is implemented. In other words, the CPU 11 extracts information items, among the information items about various genres of facilities stored in the storage device 12, that relate to the facilities that are included in the genre name designated in Step 21 and that exist within the encircled area 53. Next, with regard to the extracted facilities, display similar to that in Step 23 is implemented. When the display has been completed, the CPU 11 ends the facility search processing.

Figure 6:
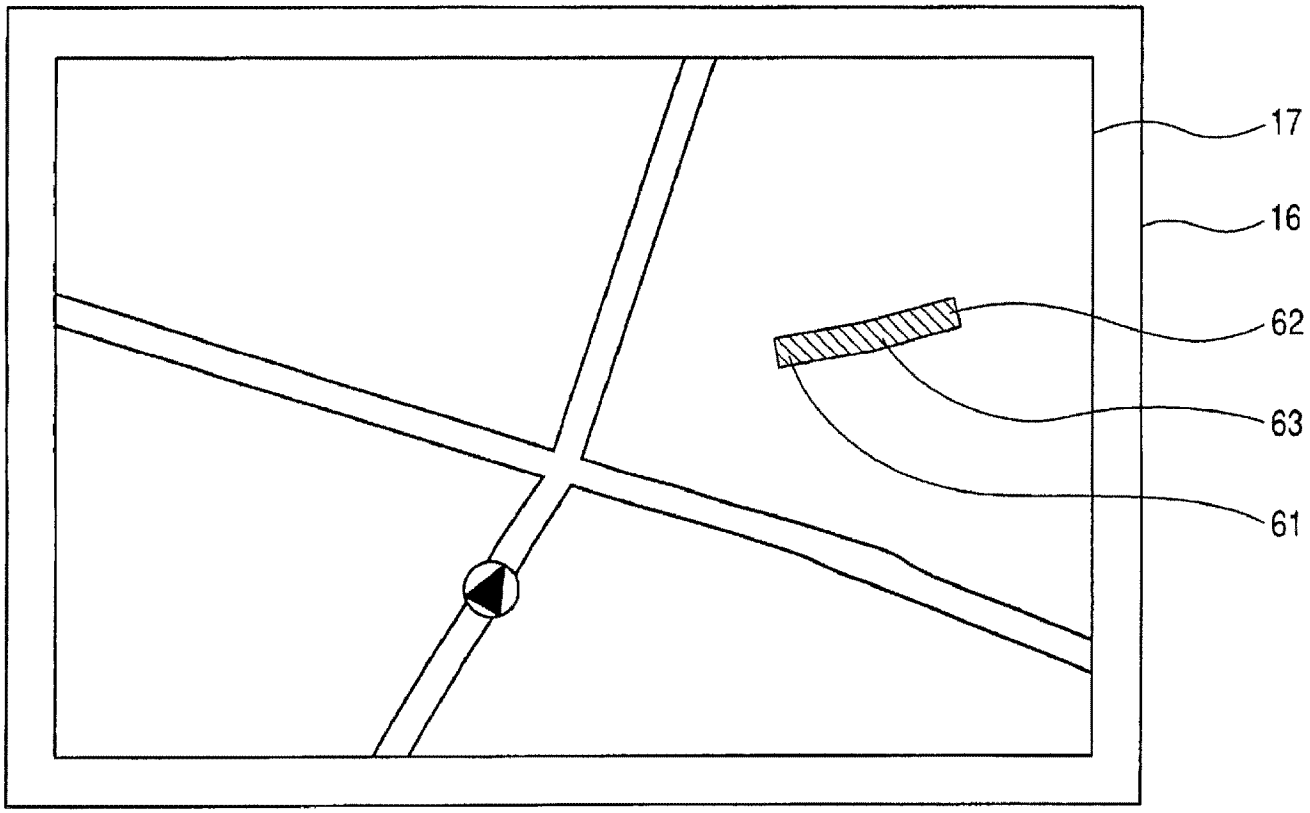
FIG. 6 is a view illustrating another appearance of the display unit, in facility search processing, of the navigation device in FIG. 1.

In Step 31, as illustrated in FIG. 6, the facility search is implemented with respect to a middle point 63 between a touch position 61 at which a touch is started and a final touch position 62. That is to say, the CPU 11, as is the case with Step 23, extracts facilities and displays the extraction result, except that the middle point is employed as the reference position. When the facility search has been completed, the CPU 11 ends the facility search processing.

In addition, in the present embodiment, a case has been explained in which, a user firstly utters a genre name and then implements touch operation; however, also in the case where, in stead of the foregoing case, the user firstly implements the touch operation and then utters the genre name, or the user utters the genre name while implementing the touch operation, the facility search is implemented in the same way.

Figure 7:
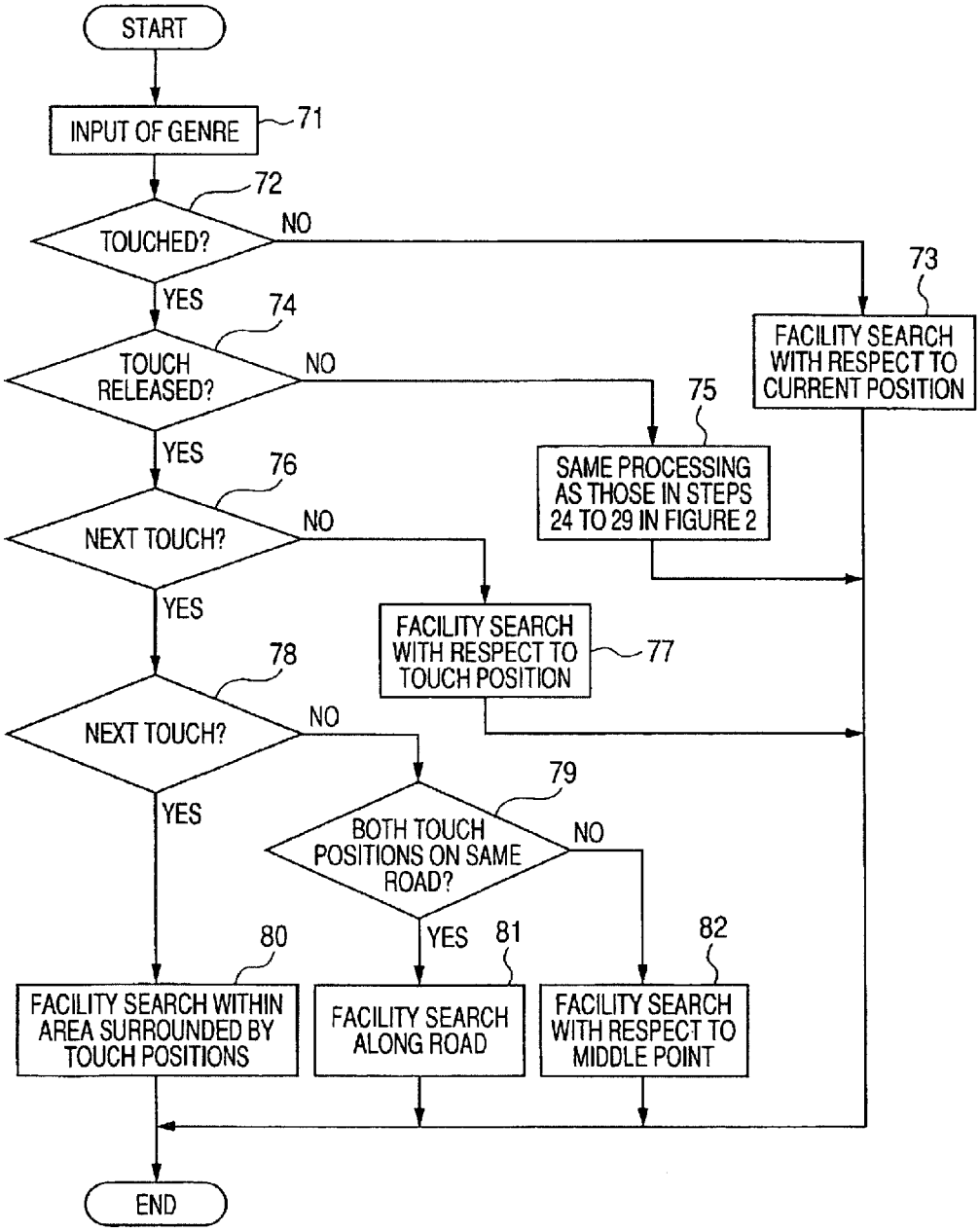
FIG. 7 is a flowchart illustrating another example of the operation, in facility search processing, of the navigation device in FIG. 1.

FIG. 7 is a flowchart illustrating another example of the operation, in facility search processing, of the navigation device. In this figure, however, FIG. 7 illustrates the operation in the case where the user firstly utters a genre name and then implements touch operation. In addition, it is assumed that, at the beginning of the processing, a map for the area surrounding a current position is displayed on the display unit 16. Additionally, it is assumed that a "touch position" signifies a position, in the displayed map, that corresponds to a position, on the touch panel 17, that is touched.

Processing in Steps 71 to 73 in FIG. 7 is the same as that in Steps 21 to 23 in FIG. 2. In Step 72, when it is determined that the touch panel 17 has been touched, the CPU 11 determines, in Step 74, whether or not the touch has been released within a predetermined time. When it is determined that the touch has been released within the predetermined time, the CPU 11 proceeds to Step 76; in contrast, when it is determined that the touch has not been released within the predetermined time, the CPU 11 proceeds to Step 75. In Step 75, after the same processing as that in Steps 24 to 29 in FIG. 2 is completed, the CPU 11 ends the facility search processing.

In Step 76, the CPU 11 determines whether or not the second touch has been made within a predetermined time from the time point of the first touch. When it is determined that the second touch has not been made within the predetermined time from the time point of the first touch, the CPU 11 proceeds to Step 77; in contrast, when it is determined that the second touch has been made within the predetermined time from the time point of the first touch, the CPU 11 proceeds to Step 78. In Step 77, after, as is the case with Step 25 in FIG. 2, implementing the facility search with reference to the touch position and displaying the search result, the CPU 11 ends the facility search processing.

In Step 78, the CPU 11 determines whether or not the third touch has been made within a predetermined time from the time point of the second touch. When it is determined that the third touch has not been made within the predetermined time from the time point of the second touch, the CPU 11 proceeds to Step 79; in contrast, when it is determined that the third touch has been made within the predetermined time from the time point of the second touch, the CPU 11 proceeds to Step 80.

In Step 80, the CPU 11 extracts facilities, among facilities existing within a triangular area having as the vertexes three touch positions inputted through the three touches, that fall under the genre name designated in Step 71. Next, with regard to the extracted facilities, the facility names, the distances between the facilities and the current position, and the like are displayed on the display unit 16. On that occasion, the display may be implemented in such a way that the facilities are arranged in order of the increasing distance between the facilities and the current position. When the display has been completed, the CPU 11 ends the facility search processing.

In Step 79, the CPU 11 determines whether or not the two touch positions inputted through the two touches are on the same road. When it is determined that the two touch positions are on the same road, the CPU 11, as is the case with Step 29 in FIG. 2, implements facility search for facilities that exist along the road and displays the search result. When it is determined that the two touch positions are not on the same road, the CPU 11, as is the case with Step 31 in FIG. 2, implements the facility search with respect to the middle position between the two touch positions and displays the search result. When the facility search has been completed, the CPU 11 ends the facility search processing.

In addition, the present invention is not limited to the foregoing embodiment and appropriate variants thereof can be implemented. For example, in the foregoing embodiment, no prioritization between the genre-name input and the touch operation is defined; however, prioritization may be defined in such a way that, in response to the touch operation, the state of the navigation device is changed to a state in which the genre-name the instruction through voice input is awaited. In this case, in a navigation device that comes into a voice-input standby mode, by depressing a PTT (Push to Talk) switch before it implements voice recognition, PTT-switch depression operation can be omitted, by making the touch operation include a function similar to the depression of the PTT switch.

Moreover, in this case, the navigation device may be designed in such a way that, in response to the touch operation, a voice talking, e.g., "May I help you?" is outputted, and the user's utterance "convenience stores" that responds to the voice output is voice-recognized and received as the instruction for facility search.

Still moreover, in Step 21 in the foregoing embodiment, a genre name is adapted to be accepted as the instruction for facility search; however, the navigation device may be designed in such a way that, in the case where, as a result of a search based on a genre name, a great number of facilities are extracted, a further input of a chain store name or the like is urged, and search subjects are further narrowed down, based on the inputted chain store name or the like. Furthermore, the navigation device may be designed in such a way that a chain store name can directly be inputted and facilities that fall under the inputted chain store name are searched. Alternatively, the navigation device may be designed in such a way that, instead of a genre name, the instruction of the usage purpose of a facility is received and the facility search is implemented based on the instruction. For example, the navigation device may be designed in such a way that, in the case where an input "dining" as a usage purpose is implemented, the facility search is carried out, based on a plurality of genres related to dining, e.g., "restaurant", "fast-food restaurant", and the like.

Figure 8:
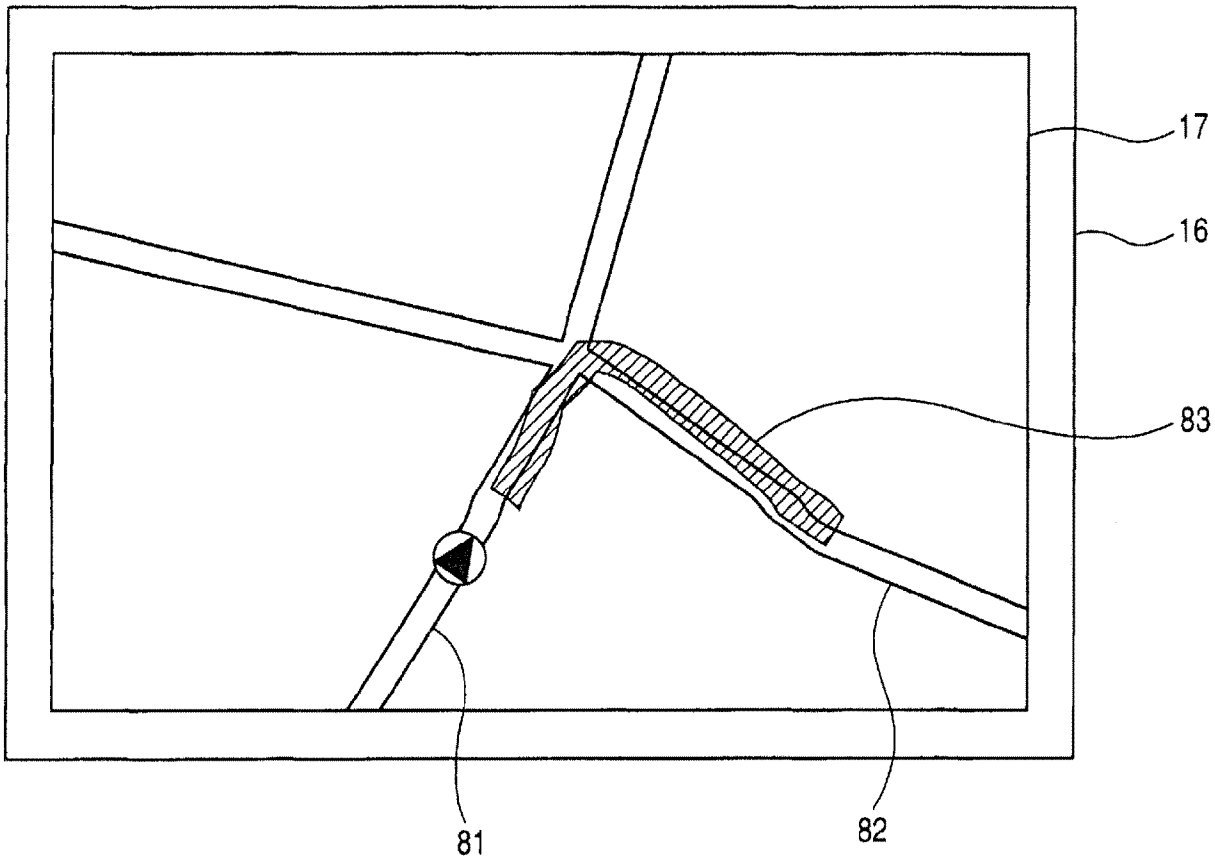
FIG. 8 is a view illustrating further another appearance of the display unit, in facility search processing, of the navigation device in FIG. 1.

Moreover, in the foregoing embodiment, the CPU 11 determines whether or not an input has been implemented in which, as illustrated in FIG. 4, a specific road in the map is traced, and in the case where positive determination is made, the facility search is implemented with regard to facilities that exist along the specific road or within a predetermined distance from the specific road; still moreover, the navigation device may be designed in such a way that the CPU 11 determines whether or not an input of a trajectory 83 has been implemented in which, as illustrated in FIG. 8, roads 81 and 82 that intersect each other or that are connected with each other are traced, and in the case where positive determination is made, the facility search is implemented with regard to facilities that exist along the roads 81 and 82 or within a predetermined distance from the respective roads 81 and 82.

Furthermore, in the foregoing embodiment, with regard to the facility search for facilities that exist along a specific road or within a predetermined distance from the specific road, no specific range along the road has not been referred to; however, the range from the beginning position to the final position of the input in which the road is traced may be defined as the search range along the road. Moreover, in the case where, as in Steps 79 and 80 in FIG. 7, two touches specify a road, the range between the touch positions may be defined as the search range. Still moreover, the range of the road, displayed on the display unit 16, may be defined as the search range.

Furthermore, in Step 80 in FIG. 7, the facility search is implemented with regard to facilities existing within a triangular area having as the vertexes three touch positions created through the three touches; however, instead of that method, the facility search may be implemented in such a way that, based on touch positions created through four or more touches consecutively made without being interrupted for more than a predetermined duration, facilities existing within a polygonal area having the touch positions as the vertexes are searched.

INDUSTRIAL APPLICABILITY

According to the present invention, merely by implementing the utterance for the instruction related to facility search and input operation for a position, facilities can be searched that exist within a desired positional area and correspond to the instruction. In other words, facility search can be implemented that is operated more easily and has a high degree of freedom.

The invention claimed is:

[1. A facility searching device comprising:

a database related to map information;

a facility database related to various genres of facilities, the database including positional information of each of the genres of facilities;

a display unit adapted to display a map for a predetermined area on the basis of the map information;

a pointing device for implementing a positional input on a displayed map;

a voice input unit adapted to implement voice input;

a determination unit adapted to determine whether or not a word inputted by the voice input unit falls under a genre name indicating a genre to which any facility in the facility database belongs;

a determination unit adapted to determine whether or not an input of a plurality of positions indicating a certain road on the map has been made as the positional input; and a search unit adapted to respond if it has been determined within a predetermined time that a word inputted by the voice input unit falls under the genre name and that an input of a plurality of positions has been made as the position input, to implement a search for facilities which belong to the genre and which exist along the road or within a predetermined distance from the road, wherein the input of a plurality of positions is an operation for moving a point position by the pointing device which pointing on the map, and wherein it is determined that an input of a plurality of positions has been made as the position input, if the plurality of positions are within a predetermined distance from the road.]

[2. The facility searching device according to claim 1, further comprising a position detection unit for acquiring a current position of the facility searching device, wherein the search unit operates to implement the search for facilities on a current position basis on the basis of the inputted genre name if it has been determined that a word inputted by the voice input unit falls under the genre name.]

[3. The facility searching device according to claim 1, further comprising a determination unit for determining whether only one position is inputted as a positional input if the positional input within the predetermined time is made and it is determined that a word inputted by the voice input falls under the genre name, wherein if it is made that only one position is inputted as a positional input, the search unit operates to implement the search for facilities on the one position basis on the basis of the inputted genre name.]

[4. The facility searching device according to claim 1, wherein it is determined that an input of a plurality of positions has been made as the positional input when the plurality of positions exist within a predetermined distance from the road and a lastly inputted position of the plurality of positions exist on the road.]

[5. The facility searching device according to claim 1, further comprising a determination unit for determining whether or not a plurality of positions indicating a certain area on the map has been made as a positional input if the positional input within the predetermined time is made and it has been determined that a word inputted by the voice input unit falls under the genre name, wherein if it is determined that a plurality of positions have been made as a positional input, the search unit operates to implement the search for facilities included in the certain area on the basis of the inputted genre name.]

[6. The facility searching device according to claim 1, further comprising a determination unit for determining whether or not a plurality of positions on the map are inputted as a positional input and the plurality of positions indicate no road and area on the map, if the predetermined input within the predetermined time has been made and it has been determined that a word inputted by the voice input unit falls under the genre name, wherein if it has been that a plurality of positions are inputted as a positional input, the search unit operates to implement the search for facilities using as a basis a position intermediate between firstly and lastly inputted positions of the plurality of positions on the basis of the inputted genre name.]

[7. The facility searching device according to claim 1, wherein the input of the plurality of positions is performed by a drag operation.]

[8. The facility searching device according to claim 1, further comprising a determination unit for determining whether or not an input tracing a single road or a plurality of roads intersecting or connected with each other on the map has been made as a positional input by the pointing device if the positional input within the predetermined time has been made and it has been determined that a word inputted by the voice input unit falls under the genre, wherein if it has been determined that the input tracing has been made a positional input by the pointing device, the search unit operates to search for facilities on the basis of the inputted genre name, the facilities being along the one or plurality of roads or existing within a predetermined distance from the one or plurality of roads.]

[9. The facility searching device according to claim 1, the search for the facilities existing along the roads or within a distance from the roads is implemented in a range from a beginning position to an end position of the input tracing a single road or the like.]

[10. The facility searching device according to claim 1, further comprising an input determination unit for determining whether an input of only two positions by a first pointing operation and a second pointing operation made within a predetermined time from the first pointing operation if the positional input within the predetermined time has been made and it has been determined that a word inputted by the voice input unit falls under the genre name and a determination unit for determining whether or not the two positions are on an identical road if it has been made that the input of only two positions has been made by the input determination unit, wherein if it has been determined that the two positions are on an identical road, the search unit operates to implement the search for the facilities existing along the road or within a predetermined distance from the road on the basis of the inputted genre name.]

[11. The facility searching device according to claim 10, wherein the search for the facilities existing along the road or with a predetermined distance from the road is implemented in an area between the two positions.]

[12. The facility searching device according to claim 10, wherein if it has been determined that the two positions are not on an identical road, the search unit operates to implement the search for facilities on an intermediate position basis for the two positions on the basis of the inputted genre name.]

[13. The facility searching device according to claim 1, further comprising a determination unit for determining whether or not an input of three or more positions by three or more pointing operations has successively made without leaving time spaces more than a predetermined time if the positional input within a predetermined time has been made and it has been determined that a word inputted by the voice unit falls under the genre name, wherein if it has been determined that an input of three or more positions has been successively made, the search unit operates to implement the search for facilities existing a triangular area or a polygonal area having its vertexes three or more positions on the basis of the inputted genre name.]

[14. The facility searching device according to claim 1, wherein the voice input unit shifts to an input acceptable state, in which an input of a genre name by voice can be accepted, in response to the input of a position on the displayed map.]

[15. The facility searching device according to claim 14, wherein the shift to the input acceptable state is performed after outputting a predetermined voice in response to the input of the position.]

[16. The facility searching device according to claim 1, wherein if the number of facilities searched by the search unit is more than a predetermined number, a voice for prompting to make a voice input of a name for narrowing a searching range is outputted, and the voice input of the name is accepted to narrow the searching range.]

[17. The facility searching device according to claim 1, if a word inputted by the input unit falls under a word indicating a predetermined utilization purpose, the input is regarded as being an input of a predetermined plurality of genre names corresponding to the utilization purpose and it is determined that a word inputted by the voice input unit falls under the genre name.]

[18. The facility searching device according to claim 1, wherein the search for the facilities existing along the road or within a predetermined distance from the road is implemented within an area of the roads that are displayed by the display unit.]

[19. A navigation device which has the facility searching device recited in any of claims 1 to 18 and which shares a map database of the facility searching device.]

[20. A computer readable medium storing a program, the program causing a computer to function as the determination unit adapted to determine whether or not a word inputted by the voice input unit falls under a genre name indicating a genre to which any facility in the facility database belongs and search unit recited in any of claims 1 to 18.]

[21. A facility searching method to be performed by a computer having a map database for map information and a facility database including positional information of each of various genres of facilities, the facility searching method comprising the steps of:

displaying on a display unit a map for a predetermined area on the basis of the map database;

accepting an input for positions on the displayed map via a pointing device;

accepting an input by voice;

determining firstly whether or not a word inputted by the voice input unit falls under a genre name indicating a genre to which any facility in the facility database belongs;

determining secondly whether or not an input of a plurality of positions indicating a certain road on the map has been made as the positional input; and searching facilities which belong to a genre and which exist along the road or within a predetermined distance from the road, in response to that it has been determined within a predetermined time that, a word inputted by the voice input unit falls under the genre name and that an input of a plurality of positions has been made as the positional input, wherein the input of a plurality of position is an operation for moving a point position by the pointing device which pointing on the map, and wherein if the plurality of positions are within a predetermined distance from the road, it is determined that an input of a plurality of positions has been made as the positional input. ]

*22. A facility searching device comprising:*

*a search unit configured to determine whether an input, which is input through a touch panel, on a displayed map is an encircling operation indicating an operation to encircle an area in the displayed map or a tracing operation indicating an operation to trace a road in the displayed map, search a facility that exists within the area if it is determined that the input is the encircling operation, and search a facility that exists along the road or within a first predetermined distance from the road if it is determined that the input is the tracing operation indicating the operation to trace the road, wherein*

*the search unit is configured to determine whether the input is the tracing operation indicating an operation to trace a plurality of roads intersecting or connected with each other in the displayed map, and, if it is determined that the input is the tracing operation indicating the operation to trace the plurality of roads intersecting or connected with each other in the displayed map, search a facility that exists along the*

*plurality of roads or exists within a first predetermined distance from the plurality of roads, and*

*the search unit is configured to determine an input of a plurality of positions is the tracing operation when the plurality of positions exist within a second predetermined distance from the road.*

*23. The facility searching device according to claim 22, wherein*

*the search unit is configured to search a facility that exists in an area within the first predetermined distance from a middle point between a beginning position of the input and a final position of the input when one of the plurality of positions does not exist within the second predetermined distance from the road.*

*24. The facility searching device according to claim 22, wherein*

*the search unit is configured to search a facility that belongs to a genre designated by a user.*

*25. The facility searching device according to claim 24, wherein*

*the genre is designated by using a voice input unit that converts an utterance by the user into a sound signal.*

*26. The facility searching device according to claim 24, wherein*

*the search unit is configured to determine whether or not the touch panel is touched within a predetermined time from a time at which the genre is designated, and search a facility that belongs to the genre on the basis of the input through the touch panel when it is determined that the touch panel is touched within the predetermined time.*

*27. The facility searching device according to claim 24, wherein*

*the search unit is configured to determine whether or not the touch panel is touched within a predetermined time from a time at which the genre is designated, and search a facility with respect to a current position when it is determined that the touch panel is not touched within the predetermined time.*

*28. The facility searching device according to claim 22, wherein*

*the input is input through a touch panel.*

*29. A facility searching method comprising:*

*determining whether an input, which is input through a touch panel, on a displayed map is an encircling operation indicating an operation to encircle an area in the displayed map or a tracing operation indicating an operation to trace a road in the displayed map;*

*searching a facility that exists within the area if it is determined that the input is the encircling operation and searching a facility that exists along the road or within a predetermined distance from the road if it is determined that the input is the tracing operation indicating the operation to trace the road, wherein*

*the determining determines whether the input is the tracing operation indicating an operation to trace a plurality of roads intersecting or connected with each other in the displayed map,*

*the determining determines that an input of a plurality of positions is the tracing operation when the plurality of positions exist within a second predetermined distance from the road, and*

*a facility is searched that exists along the plurality of roads or exists within a predetermined distance from the plurality of roads if it is determined that the input is the tracing operation indicating the operation to trace the plurality of roads intersecting or connected with each other in the displayed map.*

*30. A non-transitory computer readable medium including program instructions for searching a facility, wherein the instructions, when executed by a computer, cause the computer to perform:*

*determining whether an input, which is input through a touch panel, on a displayed map is an encircling operation indicating an operation to encircle an area in the displayed map or a tracing operation indicating an operation to trace a road in the displayed map, wherein*

*the determining determines whether the input is the tracing operation indicating an operation to trace a plurality of roads intersecting or connected with each other in the displayed map, and*

*the determining determines that an input of a plurality of positions is the tracing operation when the plurality of positions exist within a second predetermined distance from the road, and*

*searching a facility that exists within the area if it is determined that the input is the encircling operation and searching a facility that exists along the road or within a predetermined distance from the road if it is determined that the input is the tracing operation indicating the operation to trace the road, wherein*

*the searching searches a facility that exists along the plurality of roads or exists within a predetermined distance from the plurality of roads if it is determined that the input is the tracing operation indicating the operation to trace the plurality of roads intersecting or connected with each other in the displayed map.*

*31. A navigation device comprising the facility searching device according to claim 22.*

* * * * *